United States Patent [19]

Fontenot

[11] Patent Number: 4,616,359
[45] Date of Patent: Oct. 7, 1986

[54] ADAPTIVE PREFERENTIAL FLOW CONTROL FOR PACKET SWITCHING SYSTEM

[75] Inventor: Michael L. Fontenot, Boulder, Colo.

[73] Assignee: AT&T Bell Laboratories, Murray Hill, N.J.

[21] Appl. No.: 563,256

[22] Filed: Dec. 19, 1983

[51] Int. Cl.$^4$ .......................................... H04Q 11/04
[52] U.S. Cl. .................................................. 370/60
[58] Field of Search ................. 370/60, 94; 340/825.5

[56] References Cited

U.S. PATENT DOCUMENTS

| | | | |
|---|---|---|---|
| 4,074,232 | 2/1978 | Otomo et al. | 370/60 |
| 4,079,209 | 3/1978 | Schwerdtel | 370/60 |
| 4,320,500 | 3/1982 | Barberis et al. | 370/60 |
| 4,380,063 | 4/1983 | Janson et al. | 370/60 |
| 4,399,531 | 8/1983 | Grande et al. | 370/60 |
| 4,475,192 | 10/1984 | Fernow et al. | 370/94 |
| 4,500,987 | 2/1985 | Hasegawa | 370/60 |

FOREIGN PATENT DOCUMENTS

| | | | |
|---|---|---|---|
| 58-77351 | 5/1983 | Japan | 370/94 |

OTHER PUBLICATIONS

"Methods, Tools, and Observations on Flow Control in Packet-Switched Data Networks", by L. Pouzin, IEEE Trans. on Comm., vol. COM-29, No. 4, Apr. 1981.
"Bottleneck Flow Control", IBM Technical Disclosure Bulletin, vol. 24, No. 4, Sep. 1981 (New York, U.S.), pp. 2044–2046, K. Bharath-Kumar et al.
"Simulation and Performance Analysis of An X.25 Network", 1979 Conference Record, vol. 1, Nat. Telecommunications Conf., Nov. 27–29, 1979 (Washington, U.S.), pp. 3.3.1–3.3.7, G. Bockle.
"Flow-Balancing Congestion Control for Computer Networks", IBM Technical Disclosure Bulletin, vol. 25, No. 1, Jun. 1982, pp. 174–176, H. Anderson, Jr. et al.
"Data Communication System", Patents Abstracts of Japan, vol. 7, No. 162, Jul. 15, 1983, p. 1307 E-187, & JP, A, 58-70659 (NIPPON) 27 Apr. 1983, F. Akashi.
"Evaluation of Flow Control Schemes for Packet Switched Network", Proceedings of the 4th International Conf. on Computer Comm., 26–29 Sep. 1978 (Jyoto, JP), pp. 141–146, I. Takenaka et al.
"Flow Control: A Comparative Survey", IEEE Trans. on Communications, vol. COM-28, No. 4, Apr. 1980 (New York, U.S.), pp. 553–574, M. Gerla et al.

Primary Examiner—Douglas W. Olms
Assistant Examiner—Kenneth I. Rokoff
Attorney, Agent, or Firm—F. W. Padden

[57] ABSTRACT

Flow control of data packets through a packet switching network to reduce congestion is controlled by an adaptive preferential permit packet (APP) processing from an orginating data terminal through each packet switch node of the network to a destination data terminal. APP requires less buffer storage capacity at each switch node, and enables data packets to enter the network only when there is a permit packet indication that the data packets are likely to reach, and be accepted by, their destination. The permit packet is sent node to node (16–19, 25, 28) prior to a transmission of a bulk of data packets. Each node is equipped to queue buffer (12–15, 21–24) a permit packet on a preferential basis ahead of data packets. The node discards the permit packet if the number of packets awaiting transmission from that node exceeds a prescribed threshold. This is throttling process, since the originating port times out and resends a permit packet if a permit-return packet is not received within a predetermined time. Permit-return packet processing, adaptive time-out controls, and preferential treatment of permit packets are disclosed.

30 Claims, 7 Drawing Figures

(NODE PERMIT PACKET PROCESSING)

(DATA TERMINAL TIMING)

ADAPTIVE PREFERENTIAL FLOW CONTROL FOR PACKET SWITCHING SYSTEM

TECHNICAL FIELD

This invention relates to packet switching systems and particularly to a method of controlling data flow through switch nodes of such systems to avoid congestion and to reduce requirements for buffer storage at such nodes. The invention specifically pertains to a novel adaptive, preferential, permit, flow control system for reducing congestion and buffer storage requirements.

BACKGROUND OF THE INVENTION

Packet communication involves a technique of disassembling information at the sending end of a switching network for insertion into separate bursts, or packets, of data and reassembling that information from the data packets at the receiving end of the network. Communication according to this technique is especially useful in common carrier or time-shared switching systems, since the communication path or circuit required for the packet transmissions is needed only while each packet is being forwarded through the network, and is, therefore, available to other users in the periods intervening the packet transmissions.

The communication circuits which may be shared in such packet networks include transmission lines, program controlled processors, ports or links, and data or packet buffers. In large multinode networks, each node or packet switch accommodates many such ports or links that terminate paths which extend to user terminal equipment or to other nodes. Each node may include one or more processors for controlling the routing and processing of packets through the node. The node is customarily equipped with a large number of buffers for storing packets in anticipation of such routing or awaiting availability of an output link. Each line between nodes or extending to users typically serves a plurality of concurrent calls or sessions between a plurality of calling and called parties or machine terminals.

One of the problems in large packet communication or packet switching systems arises when many users attempt to utilize the network at the same time. This results in the formation of many paths or circuits for routing the data; and, resultingly, the communication facilities become congested and unavailable to a user or to the user's packet when it is being forwarded through the network. It has been found that congestion tends to spread through the network if uncontrolled. As a result, a number of flow control procedures, such as an end-to-end windowing and link-by-link watermark flow controls, have been developed and commercially exploited.

A principal area of packet congestion is in buffers, or queues, in each node particularly where the buffers become unavailable to store incoming packets. One solution to the buffer congestion problem is to halt all incoming traffic on all incoming lines to the affected node when the packet buffers become filled, or congested; and no buffer is available for storing additional incoming packets.

In data switching applications where data is exchanged only between machines and humans (i.e., when there is no intermachine traffic), it is sometimes practical to design viable packet switching systems which have no provision for flow control; and the inherent limitation on the average rate at which humans are able to interpret data can be exploited to make buffer, or queue, overflow probabilities sufficiently small. On the other hand, the average rate at which machines can generate or absorb data has no such universal limitation: it varies widely from one machine to the next, and may even be difficult to quantify for a particular machine, because it will frequently depend upon, for example, operating system specifics, application program specifics, input-output hardware assists. Packet switching networks that handle nontrivial amounts of intermachine traffic must therefore have some means of controlling the flow of data into the network, both to protect buffers, or queues, within the network, and to protect destination machines.

The simple end-to-end windowing scheme for flow control has advantageous properties when viewed strictly from the network periphery. Each machine can have many sessions simultaneously established between itself and various other machines. For each of these sessions (referred to as a logical channel), a given machine is allowed to have p unacknowledged packets outstanding in the network (p is some fixed integer chosen large enough to allow uninterrupted transmission when the network is lightly loaded). The greater the end-to-end network delay, the larger p must be. For example, a machine can initially transmit p packets into the network as fast as it desires; but it then can transmit no more packets (on that particular logical channel) until it has received an acknowledgement from the destination machine for at least one of those outstanding packets. This scheme has several very desirable properties. There is very little wasted bandwidth caused by the flow-controlling mechanism, because the number of bits in an acknowledgement can be made very small compared to the number of bits in the p packets to which it refers. There is also an automatic throttling that occurs under heavy load that divides network capacity fairly among all traffic sources. Finally, it provides automatic speed conversion between machines of different data rate because, for example, a destination can regulate the rate at which it acknowledges packets so that it will not be overwhelmed by too much data from an over-eager source.

A disadvantage of the pure windowing scheme is that it may frequently require an unacceptably large amount of buffer storage within the packet switch. To insure no loss of data, it is necessary to provide, at each buffer, or queue, in the network $c \times p$ packets of storage either (1) for every source whose packets might transmit that queue, or (2) for every destination whose packets might be fed by that queue (where c is the maximum number of sessions that a source or destination is allowed to have simultaneously in progress). Since some buffers, or queues, may be positioned in such a way that they are fed by a large number of sources, or that they feed a large number of destinations, the amount of queuing required can be impractically large (especially if the packets contain more than just a few bytes).

Flow control utilizing a link-by-link watermark principle enables each node to keep track of its own buffer, or queue, length and sends a "stop-sending" message upstream whenever the queue length exceeds some preestablished upper threshold. As soon as the queue length drops below a preestablished lower threshold, a "resume-sending" message is sent back upstream. The advantage of this scheme is that it is insensitive to the number and type of sources, and it results in the smallest possible queue requirements (because the delay between the sending of a stop-data message and the actual cessation of transmission is minimal). However, each node must know how many links feed each of its queues, and must be able to generate and send the "stop-sending" and "resume-sending" messages out on the appropriate links. Deadlocking is also a potential problem. Illustratively, suppose that the next packet in a queue of a given node is destined for a downstream node B, and suppose that the node B has sent node A a "stop-sending" message. Node A typically has links to many other nodes besides node B, and there may well be many packets in node A's queue destined for those other nodes. If node A's queue is implemented with a simple hardware FIFO, the blocked packet at the front of the queue will also block all of the subsequent packets in the queue, even though their respective outgoing links are available. In the extreme case where node B dies, node A can be indefinitely tied up; and the blockage can ripple upstream with the result that the failure of a single node can incapacitate a large portion of the network.

Such a problem could be eliminated by segregating packets as they arrive at a node according to the link on which they will be leaving the node. If node B shuts off a link x, node A can now continue to send packets out on the other links. However, eventually, queue z of node A, which feeds link x, will exceed its threshold; and then all of the links coming into node A will have to shut off. The only way to fix this problem is to make all nodes which feed node A aware of the segregated queues at node A, so that they can be told to stop sending packets bound for a particular queue at node A. The nodes immediately upstream of node A must therefore segregate their incoming packets, not just according to their own outgoing links, but also according to node A's outgoing links. In fact, each node must have a separate queue for each outgoing link of every node in the final stage of the network that it is capable of reaching. The nodes, as well as the flow control messages themselves, must therefore be quite complex if local malfunctions are to have only local effects. It is advantageous to note that the above deadlocking tendency can be initiated, not only by a network node failure, but also by a single destination becoming inactive.

SUMMARY OF THE INVENTION

The foregoing problems are solved, and a technical advance is achieved by an illustrative adaptive preferential permit (APP) flow control method in which the entry and buffering of information data packets in a packet switching network are deferred until after permit and permit-return packets are processed through that network. The APP procedure reduces network congestion and the requirements for high-capacity buffer storage in the network by both preferential processing of the permit and permit-return packets, and threshold checks of queue buffers in each switch node of the network. The preferential processing speedily determines the likely availability of buffer storage between the originating and destination terminals at the time that the data packets enter the network.

In accordance with the illustrative embodiment, before an originating terminal transmits data into the switching network, it is required to send a small permit-packet to the destination terminal via the switching network, and to receive back a permit-return packet via the network from the destination terminal when it is ready to receive data. This procedure, by buffering only the permit and permit-return packets, aids in reducing the buffering of large batches of data packets in switching nodes, while a node or the destination terminal is unprepared to receive data.

When a permit packet arrives at a queue, or buffer storage, of a packet switch node, that node first recognizes that the arriving packet is a permit packet. The node then checks to determine if the length of its queue is exceeding a preestablished threshold. If it is, the likelihood of buffer storage and communication paths being available for the data packets is diminished; and the permit packet automatically is discarded from the network. Thereafter, a new permit packet is automatically generated by the originating terminal at the end of a timeout interval controlled by that terminal. If, on the other hand, the threshold was not exceeded, the permit packet is prioritized at the front of the queue ahead of all data packets, and behind any permit packets already in the queue.

The destination terminal receives the permit packet from the network when none of the queues in the network path is exceeding its established threshold. Thereafter, the destination terminal may either discard the permit packet if it is not prepared to receive data, or form a permit-return packet when it is so prepared. The permit-return packet is prioritized, and is not discarded by any switch node on its return to the originating terminal. When the latter receives the return packet, it transmits a specified number of data packets into the network for delivery to the destination terminal.

The present invention provides an illustrative timeout arrangement which is controlled by the originating terminal. The timing commences with the sending of a permit packet into the network, and expires if a permit-return packet is not received within a prescribed interval. The timeout indicates that the permit packet was discarded by either an overloaded switching node (threshold exceeded) or by the destination terminal. Upon expiration of the timing interval, the originating terminal generates another permit packet. At about the same time, the timing interval is illustratively doubled in duration so that, during overload conditions, the network will not be flooded with permit packets. Whenever a permit-return packet is received, the originating terminal sends the prescribed number of data packets into the network for delivery to the destination terminal. Concurrently, the timeout arrangement is reset, or halved, until it reaches a predetermined minimum value.

DETAILED DESCRIPTION

Figure 1:
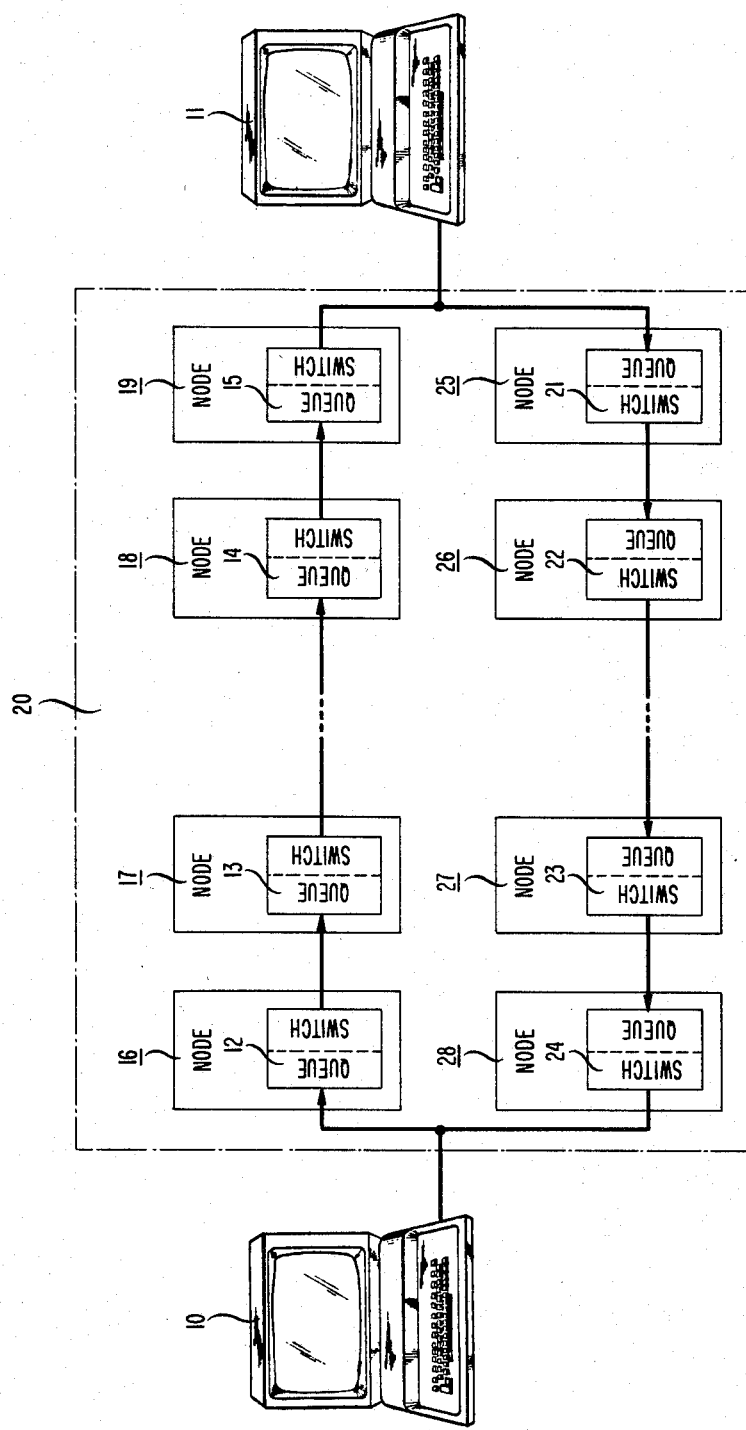
FIG. 1 illustrates a packet switching network interconnecting two data terminals.
Figure 2:
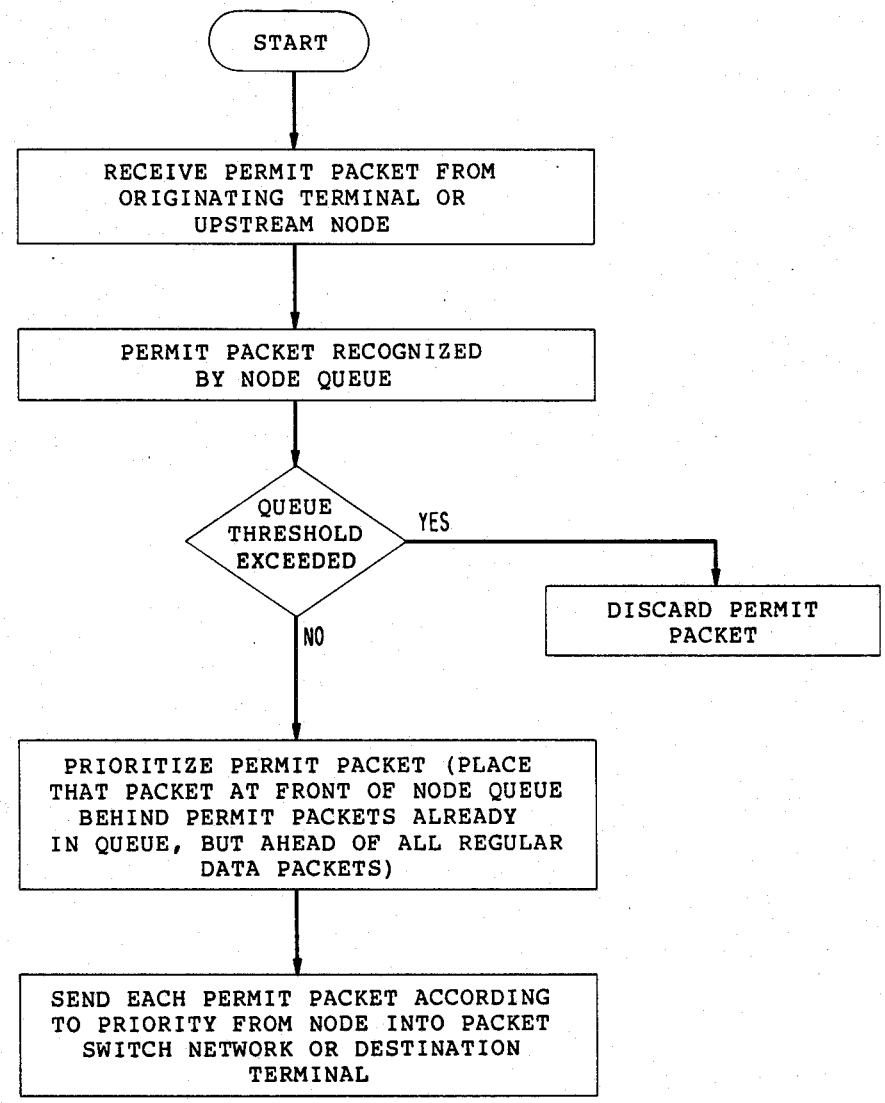
FIGS. 2 and 3 are flow charts of permit and permit-return packet processing at a packet switching node.
Figure 3:
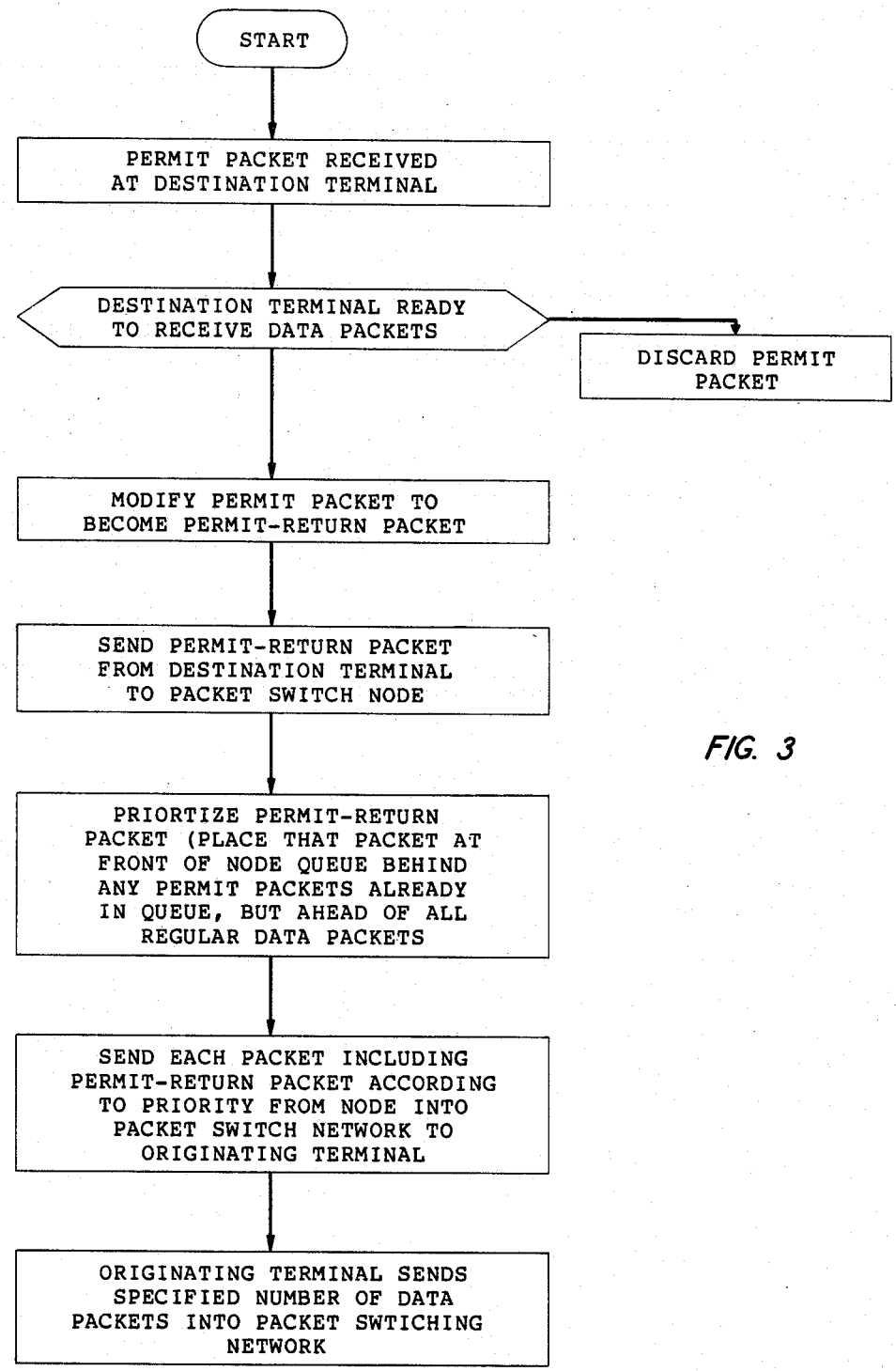

FIG. 1 shows a packet switching network with a packet communication session established between two machines (data terminals) labeled 10 and 11. Assume that machine 10, during that session, wants to send some data to machine 11. Before machine 10 transmits the data into the network, it is required, according to the present invention, to send a small permit packet to machine 11, and receive a permit-return packet therefrom when it is ready to receive data. The permit packet is designed to be as small as the specifics of the network design allow (typically a few bytes). Referring now to FIGS. 1, 2, and 3, when a permit packet arrives illustratively at any given one of the queues 12-15 of the packet switch nodes 16-19 in a packet switching network 20 on its way to machine 11, the queuing node first recognizes that the arriving packet is a permit packet. The node then checks to determine if the length of its queue is currently exceeding some preestablished threshold; if so, the permit packet is discarded; if not, the permit packet is placed at the front of the queue (ideally, it is placed behind any permit packets that are already in the queue, but ahead of all regular data packets). If none of the queues 12-15 on the route from machine 10 to 11 is exceeding its threshold, then the permit packet quickly arrives at machine 11 (because it has everywhere been given high priority), as shown in the flow chart of FIG. 2. At this point, machine 11 may simply discard the permit packet if it is not ready or not willing to receive the data from machine 10. If machine 11 does want the data from machine 10, it sends a permit-return packet back to machine 10, illustratively via queues 21-24 of the packet switch nodes 25-28. Machine 11 forms that packet by first modifying the permit packet slightly, illustratively by changing a single bit at the front of the packet, so that it will be treated differently on the return route than it was on the machine 10-to-11 route. The permit-return packet is not discarded by any of the nodes, but it is given priority at each of the queues 21-24 of nodes 25-28. The permit-return packet, therefore, quickly arrives back at machine 10, and the latter is then allowed to transmit some specified number of data packets into the network for delivery (illustratively via nodes 16-19) to machine 11.

The arrival of the permit-return packet at machine 10 indicates that, in the very recent past (because of the priority given permit packets and permit-return packets), none of the queues 12-15 along the route from machine 10 to machine 11 was overloaded. However, since there is some delay between when a port begins to send a permit's worth of data into the network, and the subsequent arrival of the data at some queue deep within the network, it is necessary to provide enough extra storage beyond the threshold to keep the probability of queue overflow very small. Very small overflow probabilities are necessary whenever some machines (e.g., so-called dumb terminals) served by the network are not capable of detecting lost data and recovering by retransmission).

Figure 4:
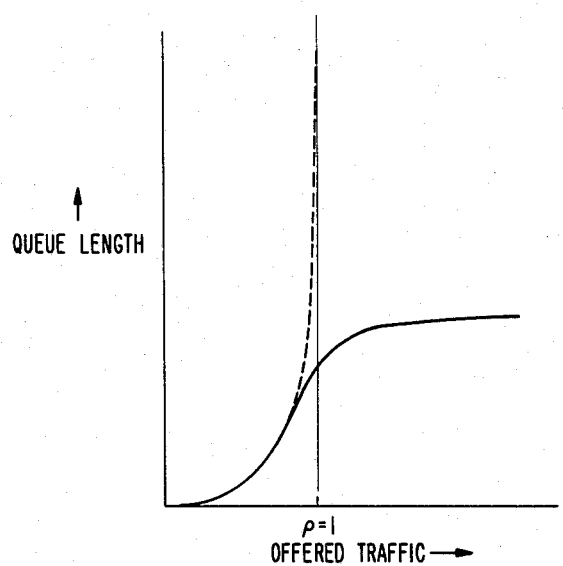
FIG. 4 graphically shows queue length versus offered traffic data.

At very low offered loads, the number of packets in the queues is small, all permits are delivered, and the flow control scheme has negligible effect on the system behavior; queue length grows with offered load according to the well-known $(1/(1-\rho))$ characteristic. Without flow control, queue lengths eventually become infinite for offered loads at or above $\rho=1$, as shown by the dashed line in FIG. 4. With the adaptive preferential packet flow control scheme, permits are discarded whenever any of the queues 12-15 begins to become congested; and, so the queue length versus offered load curve (the solid curve in FIG. 4) shows a saturation effect (i.e., queue lengths remain bounded, regardless of how high the offered load becomes). An analytical method for the approximate determination of appropriate threshold levels and queue sizes is hereinafter described.

Figure 5:
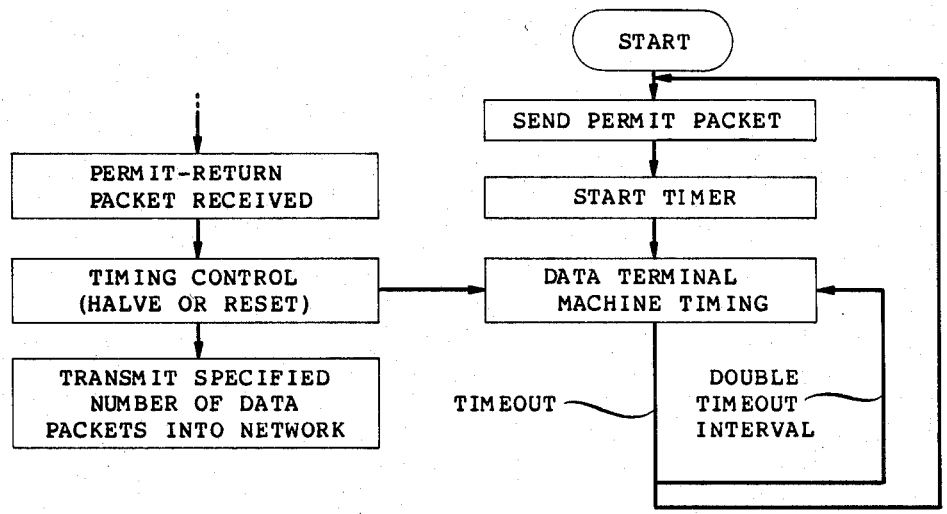
FIG. 5 illustrates a flow chart of timing operations for adaptive preferential permit (APP) flow control.

Referring now to FIG. 5, if data terminal machine 10 has not received the permit-return packet before some predetermined timeout interval has elapsed (because the permit has been discarded either by one of the nodes 16-19 along the route, or by machine 11), machine 10 transmits another permit packet into the network 20 towards machine 11 upon expiration of the timeout interval. When the second permit is transmitted, the timeout interval is illustratively doubled by operations illustratively within machine 10 (or within an interfacing device between machine 10 and network 20). Each time a timeout occurs, another permit is transmitted into network 20 by machine 10; and the timeout interval is again illustratively doubled by machine 10. Whenever a permit-return packet is received, the allowed amount (a "window") of data is transmitted from machine 10 into network 20 for delivery to machine 11; and, illustratively, the timeout interval is halved (until it reaches some predetermined minimum value).

Figure 6:
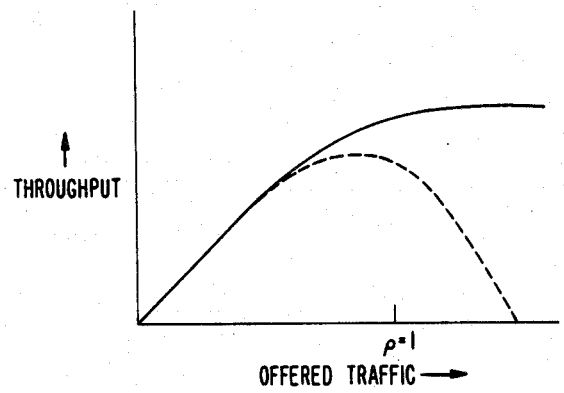
FIG. 6 depicts throughput versus offered traffic data.

The reason for the adaptive adjustment of the timeout interval is to prevent system bandwidth from being wasted in excessive permit packet transmissions during periods of heavy offered load. The throughput versus offered load curve thus has the shape of the solid curve in FIG. 6, rather than the dashed curve representative of systems whose throughput goes to zero at high loads. Note that the throttling achieved by discarding permit packets is much simpler than conventional watermark techniques: it is not necessary for an overloaded node to send messages "upstream" to shut-off offending sources.

In order to be able to achieve uninterrupted transmission from a source when the network is lightly loaded, a source, such as machine 10, is allowed to transmit its next permit packet before it finishes transmitting the previous window's worth of customer data. For example, with a window size of seven packets, the source machine 10 illustratively is allowed to transmit its next permit packet between the fifth and sixth packet of the previous window (the appropriate point within the previous window depends upon the average end-to-end network delay under light loads). This, of course, results in some degradation in the "timeliness" of the information obtained from the permit-return packets; but it is probably justified because of the resultant substantial increase in the throughput seen by individual sources. On the other hand, timeliness is a very important part of adaptive preferential packet flow control, and sources should not be allowed to stockpile permit-return packets.

The appropriate window size for a system with adaptive preferential packet flow control, as in the case of pure windowing flow control, depends upon the transit delay through the packet switching network. However, the adaptive preferential packet window size is generally much smaller than the window size in the pure windowing scheme. In the adaptive preferential packet scheme, the portion of the window following the next permit packet must be no smaller than the ratio of the round-trip time (when the system is lightly loaded) of a permit packet to a regular data packet's transmission time on the incoming link. With pure windowing flow control, the corresponding ratio has the same denominator; but the numerator is the time required (under light load) for a regular data packet to transit the network, plus the transit time of the returning acknowledgement. Since a permit packet will ordinarily be about two orders of magnitude smaller than a regular data packet, and since the permits are given priority over regular data packets, the window size with adaptive preferential packet flow control is much smaller than the window size with pure windowing flow control.

A disadvantage of adaptive preferential packet flow control, as heretofore described, is that short messages will not be delivered as quickly as in the pure windowing scheme. For example, suppose machine 11 of FIG. 1 is a dumb terminal that has sent a single character to its originating host, and the host must echo that character so that it will be displayed on the screen of terminal 11. Unless special provisions are made to the contrary, the delay from the time the character is typed at machine 11 until the character is displayed at that machine will be illustratively six network transit times (permit, permit-return, character, permit, permit-return, echo). To prevent this problem, a special type of packet (a "short data" packet) is allowed to be transmitted into the network without a permit. Any time a terminal has a short message to send (a few characters or, perhaps, a few words), it immediately transmits the message in a short-data packet. Such packets are treated by the nodes exactly like return permit packets: they are given priority over regular data packets. Although these short messages are important and must be handled quickly, they make up a small proportion of the total data traffic; therefore, their unrestricted flow into the network will not cause queue overflow problems.

Although the adaptive preferential packet flow control scheme attempts to limit queue lengths, regardless of the nature of the offered traffic, it is possible to concoct scenarios that can defeat that objective. The simplest example to visualize is the familiar freeway traffic jams during the morning rush hour. All drivers might be told (via their car radios) as they pull out of their own driveways at 7:00 a.m., that the city's arteries are currently almost completely empty. Yet, 30 minutes later, when all these cars have finally worked their way to those central arteries via the relatively slow peripheral streets, they find the usual traffic jam.

Coping with this type of offered traffic would apparently require a link-by-link watermark flow control scheme in which permission would be required to enter each successive stage of the route; however, as was noted earlier, a link-by-link approach suffers from nodal complexity and the tendency toward deadlock. Fortunately, most data communication applications differ significantly from the morning freeway example; there is more randomness in the offered traffic, start-up is not so abrupt, and the ratio of network transit times to expected interarrival times is not so extreme.

It is possible to see that, if the traffic input is sufficiently pathological, a full window's worth of storage would actually be required for each source machine (i.e., the "excessive" storage required by the windowing scheme is no longer excessive if the offered traffic is sufficiently extreme). For example, suppose that a system using adaptive preferential packet flow control is initially idle, and suddenly all of the sources (within a negligibly small interval of time) send a permit packet into the network. All of the permits will be passed (because there will currently be no regular data packets anywhere in the system); but, a short time later, the system will be inundated with a window of data from each source. However, to insist that all packet switching systems by prepared for such extreme traffic (and pay the resulting price in terms of queue size) is unwarranted. The adaptive preferential packet scheme attempts to take advantage of the fact that the traffic offered to most systems will not be nearly so harsh.

To summarize, the APP flow control scheme requires that each node be able to recognize four types of packets: permits, permit-returns, short-data, and regular-data packets. The first three types have priority over regular-data packets. Permits are thrown away if the queue length at any node exceeds the threshold (or if the destination machine does not wish to receive the data). Discarded permits are retransmitted by their source after an adaptively-determined timeout that tends to increase as total offered load increases. A window of regular packets cannot by transmitted until a permit has been sent and a permit-return has been received; short-data packets can be transmitted at any time.

An approximate analytical model for APP flow control will not be described. The basic assumption underlying the analytical model is that the APP flow control scheme will tend (on the average) to keep all queue lengths near their predetermined threshold levels, and will tend to keep all server occupancies at 100%. Of course, the topology of a network, and its relative link speeds, will frequently tend to cause one particular server to be the bottleneck, with the other server occupancies being limited to levels well below 100%; however, it is usually possible to construct some nonuniform distribution of traffic sources or traffic destinations so that any node (or set of nodes) becomes the bottleneck. Therefore, if we want the flow control scheme to be able to handle as wide a variety of offered traffic as possible, we must assume that the occupancies of all servers will be held near 100%.

The analytical model provides estimates for appropriate values of (1) the minimum timeout interval, (2) thresholds for all of the queues, and (3) maximum queue lengths. These three items will be covered hereinafter. First, however, an example network topology will be described. Although the analytical model will be derived specifically for this particular topology, the basic approach can be applied to a wide variety of topologies.

Figure 7:
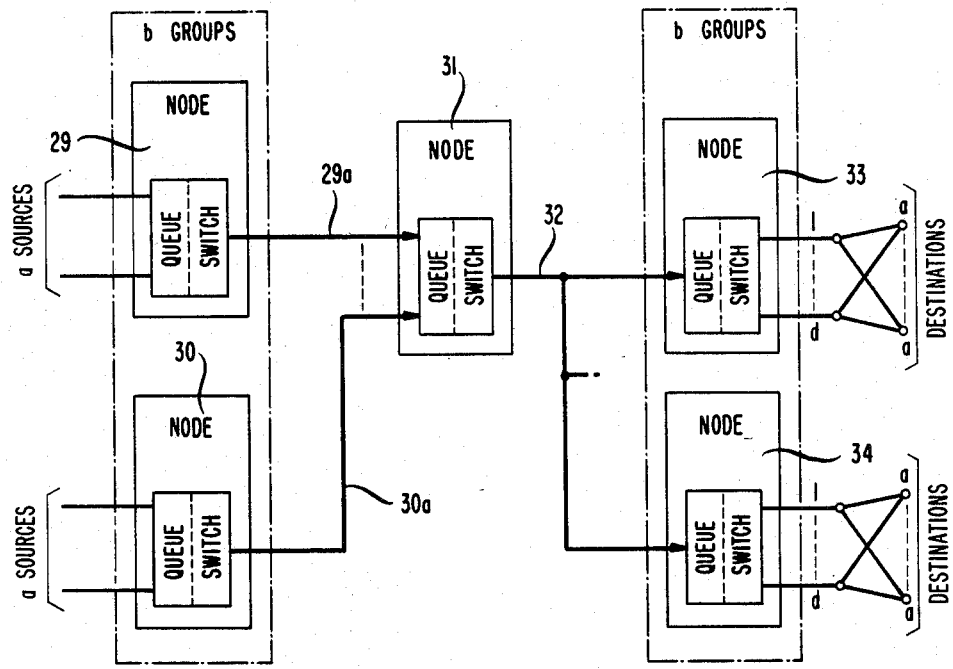
FIG. 7 shows a three-stage packet switching network of an analytical model for adaptive preferential permit flow control.

As a concrete example, consider the network shown in FIG. 7. On the left are a×b sources, in b groups of a sources each. Each source has its own link into a switch node 29–30 of the network. The link speed is such that a regular data packet requires $\tau_0$ seconds to be transmitted. These input links feed the b first stage queues of nodes 29–30 (mathematically designated as $Q_1$). Each first-stage queue has a link 29a–30a to the single second-stage queue 31 mathematically designated as ($Q_2$) with a packet service time of $\tau_1$ seconds. There is a shared link (i.e., a bus) 32 that connects node 31 to each of the third-stage queues of nodes 33–34 (mathematically designated, $Q_3$ with a packet service time of $\tau_2$. Each of the b third-stage queues can send a packet to any of its a destinations over any one of its d outgoing links 35–36. In other words, each third-stage queue has d outgoing buses which can be simultaneously transmitting packets; each bus can feed any of the destinations served by that queue. The packet service times of these buses is $\tau_3$ seconds.

The packet service times given above are for regular data packets. It is assumed that the three types of short packets (permits, permit-returns, and short-data packets) have service times that are negligible compared to the regular data packet service times. For example, a regular packet might contain several hundred bytes of data, whereas the short packets contain only several bytes, so that the service times differ by about two orders of magnitude.

It will also be assumed that the short packets have nonpreemptive priority over the regular data packets. Although the timeliness of the permit-returns would be improved by using a preemptive resume priority scheme, the implementation would be considerably more complex: it would be necessary to provide an escape mechanism so that a short packet could be embedded within the data stream of a regular data packet, without interfering with CRC checks, etc. It is assumed that, once a node begins to transmit a packet over a link, it will always finish transmitting that packet before starting to transmit some other packet.

Turning now to the minimum timeout interval, consideration is given to the time required for a permit (or a permit-return) to transit a node as being equal to the sum of two terms: the remaining service time of the packet currently being transmitted, and the sum of the service times of all short packets currently in the queue. The second component is ignored for the present example since the service times of short packets are assumed to be two orders of magnitude smaller than the regular data packet service times (and since the number of short packets waiting in a queue should never be large). It is also assumed that the packet currently in service is always a regular data packet. This last assumption is based on two factors: each delivered permit-return causes the transmission of multiple regular data packets (assume that ratio to be 7:1), and the service time ratio is about 100:1; therefore, an arriving short packet is much more likely to find a regular data packet in service than a short packet. Assuming that the arrivals are always perfectly random (i.e., the interarrival times are exponentially distributed), the mean remaining service time will be half of the regular data packet service time.

When a source wants to send some data, it first sends a permit packet into the network over its dedicated link. Since this first link is dedicated, there will be no packet currently in service on this link, so the transit time at this first-stage node $Q_1$ is just the permit service time. At $Q_1$, the permit will have an average transit time of $\tau_1/2$, plus its own negligible service time. Likewise, at $Q_2$, the average transit time will be $\tau_2/2$. At $Q_3$, there are d servers, each with a regular data packet service time of $\tau_3$; so the average time between service completions is $\tau_3/d$; therefore, the mean permit transit time at $Q_3$ is $\tau_3/2d$.

Next, we assume that the time required by the destination to "turn the permit around" and begin to send a permit-return back into the network is negligible compared to the regular data packet service times. However, the destination may well be in the process of transmitting another packet (most likely, a regular data packet), and so the mean permit-return transmit time at the first-stage node is $\tau_0/2$. The mean transit times at $Q_1$, $Q_2$, and $Q_3$ are the same as for the permit packet. Therefore, the total mean round-trip time (permit plus permit-return) is:

$$T_{RT} = \frac{\tau_0}{2} + \sum_{1}^{m} \frac{\tau_i}{s_j}, \tag{1}$$

where m is the number of network stages, and where $s_j$ is the number of servers per server-group leaving node j; in this example, m=3, and all of the $s_j$ are unity except for $s_3=d$.

Now that we know the mean round-trip time, a reasonable choice can be made for the minimum timeout interval $TO_{min}$. The timeout interval is illustratively not to be less than the mean round-trip time, because too many timeouts would be generated unnecessarily (i.e., timeouts would occur, even when the corresponding permits had not been discarded). Consequently, many redundant, unnecessary permits would be sent through the network; and bandwidth would be wasted. On the other hand, the minimum timeout is not to be too large, because throughput achievable from a particular source would suffer (i.e., there would be times when the system is capable of handling more load, but sources would have to wait unduly long before sending another permit). A reasonable choice is to specify that the minimum timeout interval should be 50% greater than the mean round-trip time:

$$TO_{min} = 1.5 \times T_{RT}. \tag{2}$$

An initial timeout interval (i.e., the setting of the timer when a newly created message sends its first permit) is now specified. This choice is not very critical, and may be chosen as $TO_{initial} = TO_{min}$.

Considering now the threshold for a given queue, suppose that the queue has been above its threshold for quite some time, so that it has been discarding all permits that come its way, and so that there are currently no regular-data packets anywhere in the network bound for that queue. Under these circumstances, the queue length will steadily decrease at an essentially constant rate, since there are no new packets entering the queue. Suppose that, just as the queue length falls below the threshold, a permit packet arrives. That permit will be passed on by the given node; and, assuming that it is not discarded by any of the other nodes, after a random time delay, it will cause some new packets to arrive at the given queue. If the APP flow control scheme is not to adversely affect throughput, it should be improbable that the queue will empty out (and idle the server) well before the new packets arrive. For the $j^{th}$ queue, the elapsed time between the passing on of a permit and the subsequent arrival of the corresponding packets (which we will refer to as the "communication delay" $CD_j$) depends upon the speeds of all of the network links, and upon the threshold levels of all of the upstream queues. Specifically, the communication delay consists of the sum of three terms. The first term is the time required to send a permit from $Q_j$ to the destination which we know from the previous arguments has mean:

$$\frac{1}{2} \sum_{j}^{m} \frac{\tau_i}{s_i}. \tag{3}$$

The second term is the time required for the permit-return to travel from the destination back to the source, which has mean:

$$\frac{\tau_0}{2} + \sum_{1}^{m} \frac{\tau_i}{s_i}. \tag{4}$$

The third term is the time required for a regular-data packet to travel from the source to queue $Q_j$. The key assumption used to arrive at an estimate of this third term is that the APP flow control scheme tends to keep each queue (on the average) at its threshold level. Let $\hat{T}_i$ denote the preestablished threshold level for queue $Q_i$. We will assume that when the given packet arrives at queue $Q_i$, the queue length (excluding the given packet) is $\hat{T}_i$, and the time required for the given packet to traverse queue $Q_i$ is:

$$\hat{T}_i \frac{\tau_i}{s_i} + \tau_i. \quad (5)$$

The first term in (5) is the mean time to transmit the $\hat{T}_i$, packets that are ahead of the given packet, and the second term is the time required to transmit the given packet itself. If we assume that the source can immediately begin to transmit the packet as soon as it receives the permit-return (i.e., assuming that the source is not currently transmitting a packet on another logical channel), then the time taken for the given packet to be transmitted over link 0 to $Q_1$ is just $\tau_0$. Therefore, the mean transit time of a regular-data packet from the source to $Q_j$ is:

$$\tau_0 + \sum_{1}^{j-1} \tau_i \left[ \frac{\hat{T}_i}{s_i} + 1 \right]. \quad (6)$$

By combining the three expressions in (3), (4), and (6), the (mean) communication delay $CD_j$ is obtained. On the other hand, the time $ET_j$ required for $Q_j$ to empty out, given that it starts at its threshold level and gets no new arrivals, is just:

$$ET_j = \hat{T}_j \frac{\tau_j}{s_j}. \quad (7)$$

Now it is desirable to insure that the communication time is not long compared to the emptying time; otherwise, the server will frequently be idle, even though there are packets waiting to be transmitted. However, we don't want the emptying time to be unnecessarily long compared to the communication time, because the result would be higher threshold levels than necessary which, in turn, would require larger queues than necessary. A reasonable compromise is to make the emptying time equal to the communication time.

Setting $ET_j = CD_j$ gives:

$$\hat{T}_j \frac{\tau_j}{s_j} = \frac{3}{2}\tau_0 + \sum_{j}^{m} \frac{\tau_i}{s_i} + \sum_{1}^{j-1} \tau_i \left[ \frac{\hat{T}_i + \frac{1}{2}}{s_i} + 1 \right]. \quad (8)$$

Equation (8) can be used to recursively calculate all of the threshold levels, since the threshold level of the $j^{th}$ queue depends only upon the thresholds of the upstream queues.

For queue sizing, it has been assumed that the effect of the APP flow control scheme will be to keep the average queue length of all queues near their threshold levels. The actual size of the queues must be somewhat greater than the threshold level, so that the probability of queue overflow will be sufficiently small. Suppose that $Q_j$ has been below its threshold for quite some time, and all permits that have come its way have been passed along. Its queue length will thus tend to grow (assuming that the sources currently want to send more data than the network can handle), and will eventually exceed its threshold. After the threshold has been exceeded, no more permits will be passed; however, suppose that immediately before the threshold was exceeded, a permit was passed on. It is now desirable to estimate the mean time which elapses before a window's worth of packets (corresponding to that last permit) arrives at $Q_j$. Denote that "window time" as $WT_j$. The key assumption that we will use next is that, during the time $WT_j$, the queue will tend to grow according to the transient behavior of an M/M/1 system operating at an occupancy of 100% (i.e., with $\rho = \lambda\tau = 1$). (Actually, an M/D/$s_j$ transient model would be more appropriate, but no such analytical results are available.) Note that it is being assumed that the APP flow control scheme tends to regulate the arrival rate to give a server occupancy of 100%. The transient M/M/1 model allows a calculation of the probability, given that there are $\hat{T}_j/eppw_j$ windows in the queue at time 0, that there will be more than $NW_j$ windows in the queue at time $WT_j/(eppw_j\tau_j/s_j)$. (The window time has been normalized here so that the time units are "window service times".) Denoting probability as $P_j[\hat{T}/eppw_j, WT_j/(eppw_j\tau_j/s_j), NW_j]$, the parameter $eppw_j$ is the effective number of packets per window. Its meaning, and method of calculation, will be discussed shortly. Determination of all of the required queue sizes is achieved by setting:

$$P_j[\hat{T}_j/eppw_j, WT_j/(eppw_j\tau_j/s_j), NW_j] = \epsilon, \quad (9)$$

where $\epsilon$ is the desired probability of queue overflow, and solving for $NW_j$. From Kleinrock, we have that:

$$P_j[k,n,t] = e^{-2t} \sum_{i=n+1}^{\infty} \{I_{i-k}(2t) + I_{i+k+1}(2t)\}, \quad (10)$$

where $I_i(t)$ is the modified Bessel function, of the first kind, of order i:

$$I_i(t) = \sum_{j=0}^{\infty} \frac{(t/2)^{i+2j}}{(i+j)! \, |j|!}, \, i > 0 \quad (11)$$

$$= I_{-i}(t), \, i < 0.$$

The modified Bessel function $I_i(t)$ differs from the common Bessel function $J_i(t)$ only in that its terms do not alternate in polarity; they are all positive. The only nontrivial aspect of calculating (10) is that measures must be taken to prevent floating-point overflows. With an interactive program, only a few iterations are required to determine the required queue size $NW_j$ for any desired overflow probability; automatic searching capability is not needed.

In order to use (10) to determine the required queue sizes, a determination of the mean window time $WT_j$ and the effective number of packets per window $eppw_j$ for each of the queues is required. The window time consists of the sum of two terms. The first term is the mean time required for the given permit to travel from $Q_j$ to the destination and back (as a permit-return) to the source. This is the same quantity already calculated for the determination of the threshold levels (Expressions (3) and (4)). The second term is the mean time required for the complete window to travel from the source to $Q_j$; this term is slightly different from the quantity in Expression (6) in that it involves a complete window, not just a single packet. If the actual number of packets per window is ppw, then it takes ppw×$\tau_0$ seconds to transmit the window over the source's link into the network (link 0). However, the complete window is not assembled at each queue before transmission begins: the nodes see the window as ppw separate packets; thus transmission of the first packet in the window through the network can proceed while the second packet is being transmitted over link 0. Therefore, the mean window delay from source to $Q_j$ is the sum of the time required for the last packet in the window to transit the first j−1 queues in the network. Therefore, the second term of $WT_j$ is identical to Expression (6), except that the first term in Expression (6), $\tau_0$, becomes ppw×$\tau_0$. It follows that $WT_j$ is related to $CD_j$ according to:

$$WT_j = CD_j - \tau_0 + \tau_0 ppw, \quad (12)$$

and, since the hereinbefore imposed constraint that $CD_j=ET_j$, it is easy to compute $WT_j$ from its simple relationship to the already known $ET_j$.

If the above methodology is used to estimate queue sizes, the results are pessimistic (i.e., the estimates are larger than necessary). Two factors contribute to the overestimation, both of which are related to the fact that the model considers the basic (indivisible) unit of traffic to be a window of data, when in fact the windows consist of separate nonoverlapping packets. First of all, if windows are going to be considered the basic traffic unit in Equation (10), then we should measure delays according to the center of the window, not to its end. Therefore, in computing $WT_j$, we should calculate the delay of the central packet in the window, rather than the last packet; and so Equation (12) is changed to:

$$WT_j = CD_j - \tau_0 + \frac{ppw}{2}\tau_0 + \frac{1}{2}\tau_0 \quad (13)$$

$$= CD_j + \left[\frac{ppw-1}{2}\right]\tau_0.$$

The second correction needed involves the fact that, because of the finite speed of the links, the packets of a window are sometimes considerably spread out in time. Consider an M/D/1 queue with isolated packets arriving in a Poisson stream. Suppose that the probability of i packets being in the queue is $P_p$. If, instead, we have batch arrivals with ppw packets in a batch (and if the batch arrival rate is 1/ppw times the above packet arrival rate, so that the server occupancy remains unchanged), then the probability of i batches being in the queue is approximately $P_p$. (This follows from the fact that the batch arrival case is roughly equivalent to a system with isolated Poisson arrivals having service times ppw times longer than in the batch case.) Since, when a "batch is in service", there is actually one packet in service and as many as ppw−1 additional packets still in the queue, the probability of (ppw)i+ppw−1 packets being in the queue is approximately $P_p$. Now, if the packets in the batch don't all arrive at the same instant, but instead arrive separated by an average of δ seconds, then the queue length will tend to be somewhere in between the M/D/1 and batch-arrival cases. (Clearly as δ→∞, the system will behave as an M/D/1 queue.) Without loss of generality, we can write:

$$NP_j = q_\infty + \alpha(\delta/(\tau_j/s_j), ppw)(q_0 - q_\infty), \quad (14)$$

where $NP_j$ is the queue length, at some specified probability level, for some given value of $\delta/(\tau_j/s_j)$, $q_\infty$ is the queue length for isolated Poisson arrivals ($\delta/(\tau_j/s_j)=\infty$), $q_0$ is the queue length for pure batch arrivals ($\delta/(\tau_j/s_j)=0$), ppw is the batch size (the actual number of packets per window), and α is some function that takes on values between 0 and 1 such that:

$$\alpha(\infty, ppw) = 0 \quad (15)$$

and $$\alpha(0, ppw) = 1.$$

Since:

$$q_0 \simeq (ppw)i + (ppw - 1) \quad (16)$$

$$\simeq (ppw)(i + 1) - 1,$$

Equation (14) becomes:

$$NP_j = q_\infty + (ppw-1)(q_\infty+1)\alpha(\delta/(\tau_j/s_j), ppw). \quad (17)$$

For the class of networks considered in this paper, the average separation δ between packets can never be less than $\tau_0$, the time required to transmit a packet over the links which connect the sources to the network; therefore, we can replace δ with $\tau_0$ in all that follows.

Results have shown that $\alpha(\tau_0/(\tau_j/s_j), ppw)$ has negligible dependence on ppw, and that α can be adequately approximated by:

$$\alpha(\tau_0/(\tau_j/s_j)) \simeq 1 - 0.29 \ln(\tau_0/(\tau_j/s_j) + 1), \quad (18)$$

$$0 < \tau_0/(\tau_j/s_j) < 30 \simeq 0, \tau_0/(\tau_j/s_j) > 30.$$

The objective is to determine a fictitious batch size $eppw_j$ with $\tau_0/(\tau_j/s_j)=0$ having the same queue length as the actual batch size with the actual give $\tau_0/(\tau_j/s_j)$. (The reason for this objective is that we already have a means of estimating the queue size whenever $\tau_0/(\tau_j/s_j)=0$ (Equation (16)). Therefore, we require that:

$$q_\infty + (ppw-1)(q_\infty+1)\alpha(\tau_0/(\tau_j/s_j)) = \quad (19)$$
$$q_\infty + (eppw_j-1)(q_\infty+1)\alpha(0),$$

which, since $\alpha(0)=1$, implies that:

$$eppw_j = 1 + (ppw-1)\alpha(\tau_0/(\tau_j/s_j)). \quad (20)$$

We can now replace ppw in Equation (13) by $eppw_j$, and making use of the constraint that $CD_j=ET_j$, we finally have:

$$WT_j = ET_j + \tau_0\left[\frac{eppw_j - 1}{2}\right]. \quad (21)$$

Using Equation (21) in Equation (9), we can determine $NW_j$, which then allows us to calculate the number of packets that each queue must be able to accommodate:

$$NP_j = eppw_j(NW_j+1) - 1. \quad (22)$$

To summarize, if we are given the topology of a network, the link speeds $\tau_j$, the number of links in each group $s_j$, and the desired probability of overflow $\epsilon$, the foregoing results allow us to specify the parameters needed for the APP flow control scheme, namely, the minimum timeout interval $TO_{min}$, the threshold levels $\hat{T}_j$, and the queue sizes $NP_j$.

First, the minimum timeout interval $TO_{min}$ is calculated from Equations (1) and (2). Next, the threshold levels $\hat{T}_j$ are recursively calculated using Equation (8), starting with $\hat{T}_1$, then $\hat{T}_2$, etc. Finally, to calculate the required queue lengths $NP_j$, proceed as follows. First, calculate the effective number of packets per window $eppw_j$ from Equations (18) and (20). Then calculate the window time $WT_j$ from Equation (21), which requires that we know $ET_j$; the $ET_j$ were obtained as the left-hand side of Equation (8) in the process of calculating the threshold levels. Once we have the $WT_j$, Equation (9) can be used to determine the required queue sizes $NW_j$, expressed in units of "effective windows." Finally, Equation (22) gives the required queue sizes $NP_j$ in units of packets.

As a first example, consider a network that has relatively slow peripheral links. Let the packet service time of the central ($2^{nd}$) switching stage (the first network stage) in FIG. 7 be 1.0 millisecond. Suppose that the previous stage (the first network stage) has a link speed that is eight times slower than the central stage, and that the input links coming into the network from the sources are eight times slower than the first stage links. Suppose that the final stage has a link speed that is 64 times slower than the central stage, but with eight links in each link group (i.e., d=8 in FIG. 7). Therefore, $\tau_0=64$, $\tau_1=8$, $\tau_2=1$, $\tau_3=64$, and $s_3=8$ (with $s_1$ and $s_2$ both equal to unity). In both examples, it will be assumed that there are ten sources served by each first-stage queue, and that there are ten first-stage queues, for a total of 100 sources in all. Similarly, there are ten destinations served by each third-stage queue; and there are ten third-stage queues. Note that the analytical model does not depend upon these topological parameters at all (although they must be specified for the simulation model). This independence is consistent with the original objective that the APP flow control procedure be insensitive to the number and type of sources connected to the network; only the link speeds and the number of links per link-group are important.

The minimum timeout interval is obtained by calculating the round-trip time from Equation (1):

$$T_{RT} = \frac{\tau_0}{2} + \tau_1 + \tau_2 + \frac{\tau_3}{s_3} \quad (23)$$

$$= \frac{64}{2} + 8 + 1 + \frac{64}{8} = 49.0,$$

and from Equation (2) we have:

$$TO_{min}=(1.5)(49.0)=73.5. \quad (24)$$

The threshold level for the first queue is obtained by calculating the emptying time:

$$ET_1 = \frac{3}{2}\tau_0 + \tau_1 + \tau_2 + \frac{\tau_3}{s_3} = 113.0, \quad (25)$$

and so:

$$\hat{T}_1 = \frac{113}{\tau_1} = 14.125 \cong 14. \quad (26)$$

Similarly, for the second and third queues:

$$ET_2=229.0 \rightarrow \hat{T}_2=229 \quad (27)$$

$$ET_3=458.5 \rightarrow \hat{T}_3=57.3\cong57. \quad (28)$$

To estimate the required size of the first queue, the effective number of packets per window needs to be computed. Assuming that the flow control scheme has been implemented with seven actual packets per window, from Equation (20):

$$eppw_1 = 1 + (ppw - 1)\alpha\left(\frac{\tau_0}{\tau_1}\right) \quad (29)$$

$$= 1 + (6)\alpha(64/8).$$

From Equation (18):

$$\alpha(8.0)=1-0.29 \ln (8.0)\cong 0.40, \quad (30)$$

and therefore:

$$eppw_1=3.4. \quad (31)$$

Likewise, for the second and third queues:

$$eppw_2=1.0 \quad (32)$$

$$eppw_3=3.4 \quad (33)$$

Next, using Equation (21), calculate the window time for $Q_1$:

$$WT_1 = ET_1 + \tau_0\left[\frac{eppw_1 - 1}{2}\right] \quad (34)$$

$$= 113.0 + (64)\left[\frac{2.4}{2}\right] = 189.8.$$

Similarly, for $Q_2$ and $Q_3$, the window times are:

$$WT_2=229.0 \quad (35)$$

$$WT_3=535.3 \quad (36)$$

Next, use Equation 9 to determine the required queue size in units of (effective) windows. Suppose the probability of overflowing a queue to be $10^{-5}$, then:

$$P_1\left[\frac{14}{3.4}, \frac{189.8}{(3.4)(8)}, NW_1\right] = 10^{-5} \rightarrow NW_1 = 20.0, \quad (37)$$

which, from equation (22), implies that the required size of $Q_1$ in units of packets is:

$$NP_1=(21)(3.4)-1=70.4\cong70. \quad (38)$$

In determining $NW_1$ from Equation (9), an interactive program can be used which accepts the user's guess for $NW_j$, and quickly returns the resulting probability of overflow. Only a few iterations are required to determine the smallest $NW_j$ that gives an overflow probability no larger than $10^{-5}$. The first argument of P[ ] in Equation (9) must be an integer (and likewise for the third argument). If the real number $\hat{T}_j/eppw_j$ is close to an integer value, it can just be rounded; otherwise, the two adjacent integers should both be used, and the two resulting values of $NW_j$ interpolated.

In a similar manner, we find that:

$$NW_2 = 320.0 \rightarrow NP_2 = 320 \qquad (39)$$

$$NW_3 = 42.5 \rightarrow NP_3 = 147. \qquad (40)$$

As a second example, consider a network similar to the above case, but with faster relative speeds at the periphery. Specifically, let $\tau_0=4$, $\tau_1=2$, $\tau_3=4$, and $s_3=2$ (with $s_1=s_2=1$). The resulting flow control parameters obtained from the analytical model are:

$$TO_{min} = 10.5 \qquad (41)$$

$$\hat{T}_1 = 6 \ NP_1 = 59$$

$$\hat{T}_2 = 24 \ NP_2 = 98$$

$$\hat{T}_3 = 24 \ NP_3 = 105.$$

A simulation model was developed to find out if the APP flow control scheme actually performs according to its objectives, and to find out if the parameter estimates obtained from the analytical model are reasonably accurate. Messages arrive according to a Poisson distribution, with average rate chosen as high as four times the capacity of the system. The number of packets in a message is geometrically distributed with a mean of 28. When a mesage is generated, a random decision is made to determine the source and destination of that message; this random decision was sometimes made according to a uniform distribution (which tends to maximize the load on the central switching stage), and sometimes according to a triangular or deterministic distribution (so that either certain sources or certain destinations tended to be unusually active, which tends to maximize the load on the peripheral stages).

Short packets (permits, permit-returns, and short-data packets) are assumed to have service times only 0.01 times as long as a regular-data packet. The window size is seven packets, and a source is allowed to send another permit between the fifth and sixth packets of the previous window. (The window size of seven was chosen somewhat arbitrarily to fully exercise the simulation model. It is considerably larger than necessary; a two-packet window would have been completely adequate to ensure full throughput from any given source when the network is lightly loaded.)

The simulation results showed that the APP flow control scheme behaves as desired (at least for all simulation runs made thus far). The amount of bandwidth used to control the flow is quite small (less than a few percent). The desired saturation effect for both throughput and queue requirements as offered traffic is increased was, in fact, observed to occur. Observed maximum queue sizes were reasonably close to the predictions of the analytical model. In the 64:8:1 case, the first-stage queue lengths were consistently smaller than predicted; this is probably due to a finite-source effect: there are only ten sources per group, and the first-stage links are capable of handling eight continuously-transmitting sources; also, in the simulation, each source has a session established on only one logical channel. The predicted third-stage queue lengths (in the 64:8:1 case) were consistently smaller than the observed queue lengths, for reasons that are currently unknown. The dynamics of a system operating under APP flow control are quite complex; and further study will be required to completely understand its behavior.

The required queue sizes under APP flow control are indeed smaller than would be required with a windowing scheme (at least for sufficiently large networks, with large number of sources, or many logical channels per source). In the example, pure windowing would require one window of storage in every queue for each logical channel of every source or destination served by that queue. With a window size of seven packets, and assuming that the average number of logical channels per source is two, then the first and third stage queues would each require 140 packets of storage; and the center stage queue would require 1400 packets of storage. (Actually, as was previously pointed out, the pure windowing scheme will usually require a much larger window size than the APP scheme; and so the differences in queue requirements between the two schemes is greater than the above numbers indicate.) In addition, if more sources were added to the network (or if more logical channels were allowed per source), queue requirements would increase proportionally in the pure windowing scheme, whereas they would remain unchanged with the APP scheme.

What is claimed is:

1. A packet flow control method for a packet switching node comprising receiving a congestion test packet during an established packet communication session through said node, and prior to an entry of data packets into said node, determining an absence of packet congestion in buffer storage of said node in response to a receipt of said test packet, advancing said test packet from said node in response to the determination of an absence of congestion, and subsequently, in response to a receipt of a congestion absent packet at said node within a prescribed timed period following said receiving of said congestion test packet, entering at least one data packet into said node for communication toward a destination.

2. The package flow control method of claim 1 wherein said determining comprises checking, in response to a receipt of said test packet, said buffer storage of said node to ascertain whether a packet storage threshold thereof is exceeded, and said advancing comprises sending said test packet from said node in response to said ascertaining that said storage threshold is not exceeded.

3. The packet flow control method of claim 2 further comprising storing said test packet in said buffer storage of said node, and prioritizing said test packet for storage in said buffer storage ahead of data packets stored therein, and behind any priorly stored test packet.

4. A packet flow control method comprising processing a congestion test packet from a first port through a packet switching network to a second port during an established session between said ports, and prior to an entry of data packets from said first port into said network, determining an absence of packet congestion in said network in response to a receipt of said test packet, communicating a congestion absent packet from said second to said first port, and entering, in response to a receipt of said congestion absent packet within a defined timed interval following a receipt of said congestion test packet for said processing, at least one data packet from said first port into said network for communication to said second port.

5. The packet flow control method of claim 4 wherein said processing comprises storing said congestion test packet in packet buffer storage of said network, and prioritizing said test packet for storage in said buffer storage ahead of data packets stored therein, and behind any priorly stored test packet.

6. The packet flow control method of claim 4 wherein said processing comprises checking, in response to a receipt of said congestion test packet, packet buffer storage of said network to ascertain whether the packet storage threshold thereof is exceeded, and advancing said test packet through said network in response to said checking ascertaining that said storage threshold is not exceeded.

7. The packet flow control method of claim 6 further comprising storing said test packet in said buffer storage after said checking ascertains that said storage threshold is not exceeded, and said advancing includes communicating the stored test packet through said network toward said second port.

8. The packet flow control method of claim 7 further comprising prioritizing said test packet for storage in said buffer storage ahead of data packets stored therein, and behind any priorly stored congestion test packets.

9. A method of controlling the flow of data packets in a multinode packet switching network comprising checking each packet buffer storage threshold of nodes of said network in response to a receipt of a permit packet, processing said permit packet from an originating port through said checked nodes of said network to a destination port when said checking indicates that said threshold is not exceeded, communicating a permit-return packet from said destination port through said network to said originating port in response to a receipt of said permit packet at said destination port, and admitting a predetermined number of data packets into said network at said originating port in response to a receipt of said permit-return packet.

10. The method in accordance with claim 9 further comprising prioritizing said permit packet in the checked buffer storage preparatory to said processing of said prioritized permit packet through said network.

11. The method in accordance with claim 10 wherein said prioritizing comprises storing said permit packet in said checked buffer storage ahead of data packets, and behind other permit packets storable therein.

12. The method in accordance with claim 9 further comprising prioritizing said permit-return in respect to other packets for said communicating of said permit-return packet through said network.

13. The method in accordance with claim 9 further comprising discarding said permit packet when said checking determines that said packet buffer storage threshold is exceeded.

14. The method in accordance with claim 9 further comprising timing for an interval prescribed for completing said processing of said permit packet through said network from said originating port, and said communicating of said permit-return packet from said destination port through said network to said originating port, discarding the processed permit packet when said checking determines that said packet buffer storage threshold is exceeded, and generating, upon an expiration of said timing, another permit packet for processing from said originating port through said network to said destination port.

15. The method in accordance with claim 14 further comprising increasing said timing interval following said generating of said other permit packet, and decreasing the increased timing interval in response to a receipt at said originating port of a permit-return packet following said processing of said other permit packet.

16. An adaptive preferential permit flow control method for a packet switching network comprising receiving a permit packet at a switching node of said network from an originating terminal during a session between said terminal and a destination terminal via said network, and prior to an entry of data packets into said node, recognizing said permit packet in said switching node, checking, in response to the recognition of said permit packet, buffer storage of a queue of said switching node for determining whether a packet storage threshold thereof is exceeded, discarding said permit packet when said checking indicates that said threshold is exceeded, prioritizing said permit packet for storage in said queue buffer storage ahead of data packets, and behind any priorly stored permit packets therein, sending said prioritized permit packet into said switching network toward said destination terminal, receiving the sent permit packet at said destination terminal, discarding the permit packet received at said destination terminal when said terminal is not ready to receive data packets, modifying said permit packet from said destination terminal to form a permit-return packet, sending said permit-return packet from said destination terminal to a packet switch node of said network for processing through said network to said originating terminal, prioritizing said permit-return packet in a queue of said packet switch node behind any permit packets and data packets priorly stored therein, sending said prioritized permit-return packet through said network toward said originating terminal, and entering a specified number of data packets into said buffer storage of said queue in response to a receipt of said permit-return packet at said originating terminal.

17. The adaptive preferential permit flow control method of claim 16 further comprising timing an interval prescribed for completing a communication of said permit and permit-return packet through said network between said originating and destination terminals, and generating another permit packet from said originating terminal for sending to said buffer storage queue upon an expiration of said timing interval.

18. The adaptive preferential permit flow control method of claim 17 further comprising multiplying said timing interval in response to the generating of said other permit packet, and reducing the multiplied timing interval in response to a subsequent receipt of a permit-return packet from said network.

19. A packet flow control method comprising processing a congestion test packet from a first port through a packet switching network to a second port during an established session between said ports and prior to an entry of data packets from said first port into said network, determining an absence of packet congestion in said network in response to a receipt of said test packet, communicating a congestion absent packet from said second to said first port, entering, in response to a receipt of said congestion absent packet, at least one data packet from said first port into said network for communication to said second port, discarding said congestion test packet in response to network congestion above a predetermined threshold, timing for an interval defined for completing said processing of said congestion test packet from said first port through said network to said second port, and said communicating of said congestion absent packet from said second port through said network to said first port, and processing another congestion test packet from said first port through said network to said second port upon an expiration of said timing interval.

20. The packet flow control method of claim 19 further comprising increasing said timing interval upon said processing of said other congestion test packet, and decreasing said timing interval in response to a receipt at said first port of a congestion absent packet following said processing of said other congestion test packet.

21. A packet flow control method comprising processing a congestion test packet from a first port through a packet switching network to a second port during an established session between said ports, and prior to an entry of data packets from said first port into said network, determining an absence of packet congestion in said network in response to a receipt of said test packet, communicating a congestion absent packet from said second to said first port, entering, in response to a receipt of said congestion absent packet, at least one data packet from said first port into said network for communication to said second port timing for an interval defined for completing said processing of said congestion test packet from said first port through said network to said second port and communicating of said congestion absent packet from said second port through said network to said first port, and processing another congestion test packet from said first port through said network to said second port upon an expiration of said timing following a receipt of said first-mentioned congestion test packet at said second port.

22. A method of controlling the flow of data packets in a multinode packet switching system comprising processing a packet for testing congestion in buffer storage of said network from an originating port through said network to a destination port during an established session therebetween and prior to a subsequent entry of data packets into said network for said session, determining packet congestion in any of said buffer storage of any said node of said network in response to a receipt of said congestion testing packet, discarding said congestion testing packet in response to said determining of buffer storage congestion, and communicating within a timed interval from said destination port through said network to said originating port a packet signifying said determining of an absence of buffer storage congestion.

23. The method in accordance with claim 22 wherein said packet congestion determining comprises checking, in response to a receipt of said congestion testing packet, each packet buffer storage of said node of said network to ascertain whether packet storage threshold thereof is exceeded, and said congestion testing packet processing comprises advancing said testing packet from each checked node in response to said checking ascertains that said storage threshold thereof is not exceeded.

24. The method in accordance with claim 23 further comprising storing each congestion testing packet in packet buffer storage after said checking ascertains that said storage threshold thereof is not exceeded.

25. The method in accordance with claim 24 further comprising prioritizing each said congestion testing packet for storage in said buffer storage ahead of data packets stored therein, and behind any priorly stored congestion testing packets.

26. The method in accordance with claim 24 further comprising storing said signifying packet in packet buffer storage of nodes of said network for communication thereof from said destination port to said originating port, and prioritizing said signifying packet for storage in said buffer storage ahead of data stored therein.

27. A method of controlling the flow of data packets in a multinode packet switching system comprising processing a packet for testing congestion in said network from an originating port through said network to a destination port during an established session therebetween and prior to a subsequent entry of data packets into said network for said session, determining packet congestion in any of said nodes of said network in response to a receipt of said congestion testing packet, discarding said congestion testing packet in response to said determining of network congestion, communicating from said destination port through said network to said originating port a packet signifying an absence of congestion, timing for an interval defined for completing said processing of said congestion testing packet from said originating port through said nodes of said network and said communicating of said signifying packet from said destination port through said network to said originating port, and processing another congestion testing packet from said originating port through said nodes of said network to said destination port upon an expiration of said timing interval.

28. The method in accordance with claim 27 further comprising multiplying said timing interval in response to a generation of said other congestion testing packet, and subsequently reducing the multiplied timing interval in response to a receipt of a said packet signifying an absence of network congestion.

29. In a packet network switching system including a plurality of nodes between a source node and a destination node, a packet flow control method for preempting a virtual circuit path between said source node and said destination node comprising transmitting a pilot packet from said source node toward said destination node and prior to an entry of information packets into said source node, assessing, in response to an arrival of said pilot packet at each said node, buffer storage capacity at said each node, controlling, in response to said assessment of said buffer storage capacity, the forward transmission of said pilot packet, and enabling an entry of said information packets into said source node in response to a pilot-return packet from said destination node to said source node within a predetermined timed interval.

30. The method of claim 29 further comprising moving, in response to said assessment, said pilot packet to a priority position in the node buffer.

* * * * *